US008703896B2

(12) United States Patent
Wang et al.

(10) Patent No.: US 8,703,896 B2
(45) Date of Patent: Apr. 22, 2014

(54) POLYURETHANE SYSTEMS HAVING NON-SAG, PAINTABILITY, AND PRIMERLESS ADHESION ON CONCRETE

(75) Inventors: Chia L. Wang, Shakopee, MN (US); John M. Davis, Bloomington, MN (US); Bryan Lienke, Farmington, MN (US)

(73) Assignee: Construction Research & Technology GmbH, Trostberg (DE)

( * ) Notice: Subject to any disclaimer, the term of this patent is extended or adjusted under 35 U.S.C. 154(b) by 67 days.

(21) Appl. No.: 13/558,424

(22) Filed: Jul. 26, 2012

(65) Prior Publication Data

US 2013/0059072 A1 Mar. 7, 2013

Related U.S. Application Data

(60) Provisional application No. 61/530,602, filed on Sep. 2, 2011, provisional application No. 61/660,045, filed on Jun. 15, 2012.

(51) Int. Cl.
| | | |
|---|---|---|
| *C08G 18/81* | (2006.01) | |
| *C08L 75/08* | (2006.01) | |
| *C08L 75/06* | (2006.01) | |
| *C09J 175/06* | (2006.01) | |
| *C09J 175/08* | (2006.01) | |
| *C08K 5/3492* | (2006.01) | |
| *C08K 5/5435* | (2006.01) | |
| *B05D 7/14* | (2006.01) | |

(52) U.S. Cl.
CPC .......... *C08L 75/08* (2013.01); *C08L 75/06* (2013.01); *C09J 175/06* (2013.01); *C09J 175/08* (2013.01); *C08K 5/34922* (2013.01); *C08K 5/5435* (2013.01); *B05D 7/14* (2013.01)
USPC .............................................. 528/45; 528/68

(58) Field of Classification Search
CPC ........ C08L 75/08; C08L 75/06; C09J 175/06; C09J 175/08; C08K 5/34922; C08K 5/5435; B05D 7/1455
USPC ..................................................... 528/45, 68
See application file for complete search history.

(56) References Cited

U.S. PATENT DOCUMENTS

| | | | |
|---|---|---|---|
| 4,043,982 | A | 8/1977 | O'Sullivan et al. |
| 4,444,976 | A | 4/1984 | Rabito |
| 4,728,710 | A | 3/1988 | Goel |
| 4,743,672 | A | 5/1988 | Goel |
| 5,002,806 | A | 3/1991 | Chung |
| 5,288,797 | A | 2/1994 | Khalil et al. |
| 5,654,085 | A | 8/1997 | Markusch et al. |
| 5,770,673 | A | 6/1998 | Markusch et al. |
| 6,265,517 | B1 | 7/2001 | Stuart |
| 6,723,821 | B2 | 4/2004 | Smith |
| 7,056,415 | B2 | 6/2006 | Meckel |
| 7,288,677 | B2 | 10/2007 | Lee et al. |
| 2001/0051219 | A1 | 12/2001 | Peter et al. |
| 2003/0149227 | A1* | 8/2003 | Okazaki ................... 528/310 |
| 2004/0096668 | A1 | 5/2004 | Peter et al. |
| 2004/0254292 | A1 | 12/2004 | Williams |
| 2006/0217567 | A1 | 9/2006 | Lee et al. |
| 2007/0055038 | A1 | 3/2007 | Gimmnich et al. |
| 2008/0004406 | A1 | 1/2008 | Lee et al. |
| 2008/0033210 | A1 | 2/2008 | Lee et al. |
| 2008/0185098 | A1 | 8/2008 | Wu et al. |
| 2008/0194788 | A1 | 8/2008 | Lee et al. |

FOREIGN PATENT DOCUMENTS

| | | | |
|---|---|---|---|
| WO | WO 01/72864 | A1 | 10/2001 |
| WO | WO 02/062864 | A2 | 8/2002 |
| WO | WO 2006/104528 | A1 | 10/2006 |

OTHER PUBLICATIONS

PCT/EP2012/064667—Written Opinion of the International Searching Authority, Oct. 29, 2012.
PCT/EP2012/064667—International Search Report, Oct. 29, 2012.
PCT/EP2012/064664—Written Opinion of the International Searching Authority, mailed Mar. 21, 2013.
PCT/EP2012/064664—International Search Report, mailed Mar. 21, 2013.

* cited by examiner

*Primary Examiner* — Kuo-Liang Peng
(74) *Attorney, Agent, or Firm* — Curatolo Sidoti Co., LPA; Joseph G. Curatolo; Salvatore A. Sidoti

(57) ABSTRACT

A two part non-sag polyurethane construction sealant or adhesive is provided with the properties of low modulus, high elongation, good paint adhesion, and primerless adhesion to concrete surfaces. The sealant or adhesive is prepared using a polyol, and optionally an epoxy silane and/or a melamine compound, in the base component of the formulation; and a prepolymer reaction product including the residues of xylenol or xylenol and an additional polyol, and a polymeric isocyanate, an aromatic diisocyanate, or a polymeric isocyanate and an aromatic diisocyanate, and optionally an epoxy silane and/or a melamine compound, in the activator component of the formulation.

26 Claims, No Drawings

POLYURETHANE SYSTEMS HAVING NON-SAG, PAINTABILITY, AND PRIMERLESS ADHESION ON CONCRETE

CROSS REFERENCE TO RELATED APPLICATIONS

The present application claims the benefit of U.S. Provisional Patent Application Ser. No. 61/530,602, filed Sep. 2, 2011 and U.S. Provisional Patent Application Ser. No. 61/660,045, filed Jun. 15, 2012 pursuant to 35 U.S.C. §119 (e), both applications incorporated herein by reference.

Polyurethanes have suitable properties for many useful products, including elastomeric sealants prepared from the reaction of hydroxy-functional components with isocyanate-functional components. Polyurethanes have utility as high performance sealants having high elongation and low modulus and are suitable for commercial building and construction for exterior sealing.

It is desirable for a sealant to demonstrate thixotropy for sufficient fluidity in mixing and application, but resistance to flow or sagging after application to vertical substrate surfaces. Gunnable sealants suitable for application using a sealant gun exhibit non-sag characteristics, being substantially free from or resistant to sagging or slumping after application to vertical substrate surfaces. The known methods of enhancing the non-sag properties of polyurethane sealant or adhesive formulations can have drawbacks. Non-sag additives, such as polyamines, primary or secondary amines and diamines, are reactive with isocyanate groups, and therefore, polyurethane products formulated with such additives have limited storage stability which impacts their usefulness. Other methods of improving non-sag performance include using castor oil, amide or other thixotropic products. However, the non-sag properties of such formulations can be adversely affected after high shear force mixing, and such formulations have short "pot-life" or working time due to the very high reactivity of most amine compounds towards isocyanates. Incorporating fillers to increase the sag resistance also increases the viscosity of the components containing the filler and makes it difficult to mix the components and then spread the composition on a substrate. It is known to add urea paste prepared by mixing aromatic isocyanate and a primary amine, such as butylamine, into one-part or two-part systems for non-sag and adhesion performance, and for its increased tolerance to more shear force. However, urea paste is difficult to manufacture, requires high speed grinding during the preparation step to remove grainy particles, and represents an additional step in the process.

Thus, the need exists for a high performance, two part construction sealant that exhibits sag resistance immediately upon mixing the two parts, Part A (Base) and Part B (Activator). There is also a need for a non-sag, two part construction sealant in which the base and activator components have sufficiently low viscosity for easy mixing and application. What is also desired is a two part construction sealant that exhibits primerless adhesion to concrete surfaces and paintability in the absence of a primer, thus eliminating the steps of priming of concrete before sealant application and priming of the sealant before painting. It is also desired that the construction sealant have properties of low modulus and high elongation for high movement capability.

A two part construction sealant or adhesive is provided, comprising a base component Part A and an activator component Part B, wherein Part A comprises an epoxy silane, a melamine compound, and a polyol; and Part B comprises a prepolymer reaction product comprising the residues of xylenol or xylenol and an additional polyol, and a polymeric isocyanate or a polymeric isocyanate and an aromatic diisocyanate.

In certain embodiments, the sealant or adhesive exhibits at least one of a paint adhesion of at least about 3B when tested according to ASTM D3359, a non-sag value of about 0.0-0.1 B/S when tested according to ASTM D-2202, a primerless adhesion to concrete of at least about 22.2 N (5 lbf) when tested according to ASTM C794, a 100% modulus of less than about 970 kPa (140 psi) when tested according to ASTM D412, and an elongation to break of about 200% or greater when tested according to ASTM D412. In particular embodiments, the sealant or adhesive exhibits a primerless adhesion to concrete of about 44.4 N (10 lbf) to about 130 N (30 lbf), a 100% modulus of about 275 kPa (39.9 psi) to about 938 kPa (136 psi), and an elongation to break of about 209 to about 485% when tested according to the standards noted above.

For purposes of illustration but not by way of limitation, the epoxy silane may comprise at least one of 3-glycidoxypropyl trimethoxysilane, 3-glycidoxypropyltriethoxysi lane, 3-glycidoxypropyl methyldimethoxysilane, 3-glycidoxypropylmethyldiethoxysilane, beta-(3,4-epoxycyclohexyl)ethyltrimethoxysilane, beta-(3,4-epoxycyclohexyl)ethyltriethoxysilane, or mixtures thereof. In certain embodiments, the epoxy silane comprises 3-glycidoxypropyltrimethoxysilane.

In certain embodiments, the melamine compound comprises at least one of hexamethoxymethyl melamine formaldehyde resin; pentamethoxymethyl melamine formaldehyde resin; hexamethoxy n-butyl/methyl melamine formaldehyde resin; pentamethoxy methyl/n-butyl melamine formaldehyde resin; imino type, methylated melamine formaldehyde resin; methylol type, n-butylated melamine formaldehyde resin; or mixtures thereof.

In certain embodiments, the xylenol component may comprise at least one of 2,5-xylenol, 2,4-xylenol, 2,6-xylenol, 2,3-xylenol, 3,4-xylenol, 3,5-xylenol, or mixtures thereof.

In certain embodiments, the polyol component of Part A comprises at least one of a diol, triol or tetrol with a nominal weight average molecular weight of between 1,000 and 6,000, or mixtures thereof. The molecular weight may be calculated by a formula based on gel permeation chromatography (GPC). In certain embodiments, the Part A diol, triol or tetrol comprises at least one of a polyether or a polyester triol. In certain embodiments, the Part A diol, triol or tetrol comprises at least one primary hydroxyl terminated polyol.

For purposes of illustration but not by way of limitation, the diol or triol or tetrol comprises at least one of polyether polyol, propoxylated ethylenediamine polyol, polypropylene glycol, propylene oxide adduct of glycerine, or amine-based polyether polyol.

In certain embodiments, suitable diols, triols or tetrols may comprise, but are not limited to, Pluracol® 726 and Pluracol® P1010, which are commercially available from BASF Corporation. Pluracol® 726 polyol is a 3,000 molecular weight propylene oxide adduct of glycerin having a nominal functionality of 3, and a hydroxyl number of 57-59, available from BASF Corporation, Wyandotte, Mich. Pluracol® P1010 polyol is a 1,000 molecular weight polypropylene glycol formed by adding propylene oxide to a propylene glycol nucleus, having a nominal functionality of 2, and a hydroxyl number of 102-112 available from BASF Corporation, Wyandotte, Mich. In certain embodiments, the diol or triol or tetrol may comprise Multranol® 9168, a polyether polyol from Bayer Material Science, having a molecular weight of 3,740 and a functionality of 4. In certain embodiments, the triol is Pluracol® 220 from BASF Corporation (Wyandotte, Mich.), a 6,000 nominal molecular weight primary hydroxyl terminated polyol, having a nominal functionality of 3 and a hydroxyl number (mg KOH/gm) of 25.6-27.6.

In certain embodiments, Part A additionally comprises at least one of piperazine, ethylenediamine, naphthalenediamine or mixtures thereof.

In certain embodiments, Part A additionally comprises a plasticizer. In certain embodiments, the plasticizer may comprise dipropyl heptyl phthalate ester, diisooctyl phthalate, diisononyl phthalate, diisodecyl phthalate, and/or 1,2-cyclohexanedicarboxylic acid diisononyl ester.

Part B comprises an isocyanate terminated prepolymer reaction product, which comprises at least one of:

i) the reaction product of xylenol and a polymeric isocyanate;

ii) the reaction product of a polyol and an aromatic diisocyanate with an intermediate reaction product of xylenol and a polymeric isocyanate;

iii) the reaction product of xylenol and a polymeric isocyanate with an intermediate reaction product of a polyol and an aromatic diisocyanate;

iv) the reaction product of xylenol, a polyol, a polymeric isocyanate and an aromatic diisocyanate; or v) the reaction product of xylenol with an intermediate reaction product of polyol and aromatic diisocyanate.

Optionally, the activator component Part B may additionally comprise at least one epoxy silane or a mixture of at least one epoxy silane and at least one melamine compound.

In certain embodiments, the Part B aromatic diisocyanate component of the prepolymer, for purposes of illustration but not by way of limitation, may comprise at least one of toluene diisocyanates (TDI), methylene diphenyl diisocyanates (MDI), phenylene diisocyanate, diphenylmethane diisocyanate, polyphenylmethane polyisocyanate (Polymeric MDI), naphthalene diisocyanate, triphenylmethane triisocyanate, diphenyl sulfone diisocyanate, dimers and/or trimers of these diisocyanates, or mixtures thereof.

For purposes of illustration but not by way of limitation, in certain embodiments, the aromatic diisocyanate may comprise at least one of toluene 2,4-diisocyanate, toluene 2,6-diisocyanate, naphthylene 1,5-diisocyanate, 4,4'-methylene diphenyl diisocyanate, 2,4'-methylene diphenyl diisocyanate, urethodione diisocyanate, hexahydrotolylene diisocyanate (and isomers), 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate; and 3,3'-dimethyldiphenylmethane-4,4'-diisocyanate, dimers and/or trimers of these isocyanates, or mixtures thereof. In certain embodiments, the Part B aromatic diisocyanate component of the prepolymer may comprise toluene diisocyanate (TDI), methylene diphenyl diisocyanate (MDI), or mixtures thereof.

For purposes of illustration but not by way of limitation, in certain embodiments, the diisocyanate is toluene diisocyanate (TDI) that is an 80%-20% mixture of the 2,4 and 2,6 isomers of toluene diisocyanate, commercially available as Lupranate® T80 from BASF Corporation. In certain embodiments, the isocyanate is pure 2,4 diphenylmethane diisocyanate, commercially available as Lupranate® MI from BASF Corporation. In certain embodiments, the isocyanate is a solvent-free polymeric methylene diphenyl diisocyanate (MDI) with a functionality of approximately 2.3 which contains a relatively high level of pure MDI, commercially available as Lupranate® M10 from BASF Corporation.

For purposes of illustration but not by way of limitation, the Part B polyol component may comprise at least one of a diol, triol or tetrol with a nominal weight average molecular weight of between 1,000 and 6,000. In certain embodiments, the theoretical % NCO of Part B is in the range of about 2 to about 10%, as measured by 0.1N HCl Titration using an automatic titrator, pursuant to ASTM D-2572-90 (Test Method for Isocyanate Groups in Urethane Prepolymers).

In certain embodiments, the Part B polyol component may comprise at least one of a polyester polyol or a polyether polyol. For purposes of illustration but not by way of limitation, the polyol may comprise at least one of Pluracol® 726 and Pluracol® P1010, which are commercially available from BASF Corporation, which are described in detail above.

The polyether polyols may be formed with an initiator, as is known in the art, and may be at least one of, but not limited to, ethylene glycol, diethylene glycol, propylene glycol, dipropylene glycol, butanediol, glycerol, trimethylolpropane, triethanolamine, pentaerythritol or sorbitol. 1,4-Butanediol may be used as a chain extender in the synthesis of the urethane prepolymer.

In certain embodiments, Part B additionally comprises a plasticizer. In certain embodiments, the plasticizer may comprise dipropyl heptyl phthalate ester.

In certain embodiments, Part A may additionally comprise at least one of any of conventional, commercially available catalyst, inorganic filler, colorant, antioxidant, UV light absorber, adhesion promoter, calcium oxide, expandable microspheres including Expancel® products available from AkzoNobel, drying agents, or mixtures thereof. In certain embodiments, Part A may additionally comprise at least one of any of conventional, commercially available organic fillers, chain extenders, UV stabilizers, light stabilizers, fungicides, mildewcides, biocides, fire retardants, surface additives, solvents, mineral oils, dispersing agents, defoaming agents, storage stabilizers, latent hardeners, cure retarders, antifoaming agents, solvents, or mixtures thereof.

In certain embodiments, the total amount of such additives may be from about 10 to about 55 weight percent; and in certain embodiments about 30 to about 50 weight percent, based on the total weight of the Part A formulation.

By way of example, but not of limitation, the sealant and adhesive formulations may contain from 0 to about 5 percent by weight of UV absorbers, from 0 to 5 percent by weight of antioxidants, from 0 to about 2 percent by weight of mildewcides, from 0 to about 2 percent by weight of biocides, from 0 to about 2 percent by weight of fungicides, from 0 to about 20 percent by weight of fire or flame retardants, from 0 to about 10 percent by weight of pigments, from 0 to about 2 percent by weight of catalysts, from 0 to about 5 percent by weight of adhesion promoters, from 0 to about 10 percent by weight of flow and leveling additives, from 0 to about 2 percent by weight of wetting agents, from 0 to about 2 percent by weight of antifoaming agents, from 0 to about 2 percent by weight of storage stabilizers, from 0 to about 10 percent by weight of latent hardeners, from 0 to about 30 percent by weight of plasticizers, from 0 to about 5 percent by weight of dispersing agents, from 0 to about 10 percent by weight solvents, and in certain embodiments from 3 to about 10 percent by weight solvents, from about 20 to about 50 percent by weight of fillers, from about 0 to about 5 (0 to about 5) percent by weight of drying agents, and/or from 0 to about 5 percent by weight of rheology modifiers.

For purposes of illustration but not by way of limitation, the plasticizer may comprise adipate, azelainate, sebacate, sulfonate, trimellitate, phosphate, fumarate, or maleate ester or diester, or mixtures thereof. For illustration purposes but not by way of limitation, the plasticizer may comprise at least one of dioctyl adipate, 2-ethylhexyl adipate, diisononyl adipate, or diisodecyl adipate, di(2-ethylhexyl)azelainate, di(2-ethylhexyl)sebacate, phenyl alkylsulfonates, tri(2-ethylhexyl)trimellitate, triphenyl phosphate, tricresyl phosphate, trixylenyl phosphate, cresyl diphenyl phosphate, xylenyl diphenyl phosphate, butyl fumarate, bis(2-methylpropyl) fumarate, diisobutyl fumarate, or bis(2-ethylhexyl) fumarate, dimethyl maleate or diethyl maleate, di-(2-propyl heptyl) phthalate or mixtures thereof. The plasticizer may comprise Palatinol® DPHP (di-(2-propyl heptyl) phthalate ester) from BASF Corporation. The amount of plasticizer used in some embodiments may be about 0% to about 8%, in certain embodiments, about 2% to about 7% by weight, based on the total weight of the prepolymer.

In certain embodiments, adhesion promoters may also be used in the adhesive or sealant formulations. For purposes of illustration but not by way of limitation, adhesion promoters may include, but are not limited to, at least one of 2-aminoethyl-dimethylmethoxysilane, 6-aminohexyl-tributoxysilane, 3-aminopropyl-trimethoxysilane, 3-aminopropyl-triethoxysilane, 3-aminopropyl-methyldimethoxysilane, 3-aminopropyl-methyldiethoxysilane, 5-aminopentyl-trimethoxysilane. 5-aminopentyl-triethoxysilane, 3-aminopropyl-triisopropoxysilane, γ-mercaptopropyltrimethoxysilane, γ-mercaptopropyltriethoxysilane, γ-ureidopropyltrimethoxysilane, γ-ureidopropyltriethoxysilane, 1-[3-(trimethoxysilyl)propyl]urea, 1-[3-(triethoxysilyl)propyl]urea, [3-(2-aminoethylamino)propyl]trimethoxysilane, [3-(2-aminoethylamino)propyl]triethoxysilane, 3-(phenylamino)propyl-trimethoxysilane, 3-(phenylamino)propyl-triethoxysilane, bis[3-(trimethoxysilyl)propyl]amine, bis[3-(triethoxysilyl)propyl]amine, 3-mercaptopropyl-methyldimethoxysilane, 3-mercaptopropyl-methyldiethoxysilane, [3-(2-aminoethylamino)propyl] methyl dimethoxysilane, [3-(2-aminoethylamino)propyl] methyl diethoxysilane, or combinations thereof.

In certain, embodiments, one or more storage stabilizers can be used in Part A or Part B of the adhesive or sealant formulations, including but not limited to, para toluene sulfonyl isocyanate (PTSI).

In certain embodiments, one or more conventional catalysts which accelerate the isocyanate-polyol reaction may be used. In certain embodiments, one or more conventional tertiary amine catalysts may be used. For purposes of illustration but not by way of limitation, tertiary amines may include triethylenediamine, dimethylethanolamine, triethanolamine, N-ethyl morpholine, N-methyldicyclohexylamine, N,N-dimethyl cyclolhexylamine, N,N,N',N'-tetramethyl-1,3-butanediamine, ether and the like. Suitable tertiary amine catalysts may include Dabco 33LV, available from Air Products & Chemicals, Inc., Dabco T-12 catalyst, or mixtures thereof.

The amount of catalysts, if used, may be in certain embodiments about 0.02 to about 1 weight percent and in certain embodiments about 0.06 to about 0.4 weight percent, based on the total weight of the prepolymer.

In certain embodiments, to avoid the inclusion of water during processing, an alkaline earth metal oxide, such as calcium oxide or calcium sulfate, may be included in the formulation as a de-watering agent, i.e., drying agent, for scavenging water from the formulation. For purposes of illustration but not by way of limitation, the drying agent may comprise para toluene sulfonyl isocyanate (PTSI). The amount of drying agent typically used usually may be about 0.05% to about 3%, in certain embodiments, about 0.1% to about 1% by weight, based on the total weight of the prepolymer.

The additional polyurethane sealant and adhesive components may be incorporated separately or may be combined with any reaction component. The additional ingredients may be mixed by conventional means, such as in an inert, dry atmosphere. The ingredients may be mixed together all at one time (in a "one stage" process); alternatively, some ingredients and/or portions of ingredients may be mixed together in one operation (or "stage"), with other ingredients and/or portions of ingredients added in an additional stage or stages.

In certain embodiments, the viscosity of the sealant or adhesive may be in the range of 500 Pa·s (5,000 poise) to 3,500 Pa·s (35,000 poise) at 24° C. (72° F.), and in certain embodiments from 600 Pa·s (6,000 poise) to 1,500 Pa·s (15,000 poise) at 24° C. (72° F.), as measured by Brookfield viscometer.

Also provided is a method of making the two part construction sealant or adhesive comprising Part A and Part B described above, the method comprising, a) providing the base component Part A and the activator component Part B, and b) mixing the activator component Part B with base component Part A to form a sealant or adhesive reaction product.

In certain embodiments, the activator component Part B is made by a) providing xylenol and polymeric isocyanate, and b) mixing the xylenol with the polymeric isocyanate to form an isocyanate-terminated prepolymer reaction product.

In certain embodiments, the activator component Part B is made by a) providing xylenol, polymeric isocyanate, at least one polyol, and at least one aromatic diisocyanate, b) mixing the xylenol with the polymeric isocyanate to form an intermediate reaction product, and c) mixing the polyol and the aromatic diisocyanate with the intermediate reaction product to form an isocyanate-terminated prepolymer reaction product.

In certain embodiments, the activator component Part B is made by a) providing xylenol, polymeric isocyanate, at least one polyol, and at least one aromatic diisocyanate, b) mixing the polyol and the aromatic diisocyanate to form an intermediate reaction product, and c) mixing the xylenol and the polymeric isocyanate with the intermediate reaction product to form an isocyanate-terminated prepolymer reaction product.

In certain embodiments, the activator component Part B is made by a) providing xylenol, polymeric isocyanate, at least one polyol, and at least one aromatic diisocyanate, b) mixing the xylenol, the polymeric isocyanate, the polyol, and the aromatic diisocyanate to form an isocyanate-terminated prepolymer reaction product.

In certain embodiments, the activator component Part B is made by a) providing xylenol, at least one polyol, and at least one aromatic diisocyanate, b) mixing the polyol and the aromatic diisocyanate to form an intermediate reaction product, and c) mixing the xylenol with the intermediate reaction product to form an isocyanate-terminated prepolymer reaction product.

Optionally, the activator component Part B of the above embodiments may additionally comprise at least one epoxy silane or a mixture of at least one epoxy silane and at least one melamine compound.

In certain embodiments, the polyurethane sealants or adhesives are suitable for the adhesive bonding of substrates including, but not limited to, at least one of concrete, stone, metal, ceramic, glass, plastic, wood, asphalt, thermoplastic materials, thermoset materials, rubber, or composite materials.

For purposes of illustration but not by way of limitation, the polyurethane sealants or adhesives are suitable for application to substrates by spraying, brushing, rolling, squeegeeing, scraping, troweling, or combinations thereof.

Improved performance is typically obtained for clean and dry substrate surfaces. Surface preparation before sealant application can include water-blasting, sandblasting, cleaning, and drying of concrete surfaces, cleaning of metal surfaces with organic solvents, scuff-sanding and organic solvent wiping of composite surfaces, flame-etching of plastic surfaces, and the like. When applied to a substrate, in certain embodiments, a polyurethane sealant is provided that is at least about 0.64 cm (0.25 inch) thick. In other embodiments, the polyurethane sealant is from about 0.64 cm (0.25 inch) to about 3.2 cm (1.25 inch) thick.

In certain embodiments, a polyurethane sealant or adhesive is provided, wherein the sealant or adhesive may have a 100 percent modulus of less than about 1,030 kPa (150 psi). In other embodiments, the polyurethane sealant may have a 100 percent modulus of about 275 kPa (40 psi) to about 830 kPa (120 psi). In yet other embodiments, the polyurethane sealant may have a 100 percent modulus of about 345 kPa (50 psi) to about 690 kPa (100 psi).

In certain embodiments, the polyurethane sealant may have a tensile strength of about 550 kPa (80 psi) or greater. In other embodiments, the polyurethane sealant may have a tensile strength of about 690 kPa (100 psi) or greater. In yet other embodiments, the polyurethane sealant may have a tensile strength of about 970 kPa (140 psi) or greater.

In certain embodiments, the polyurethane sealant may have an elongation at break of about 150 percent or greater. In other embodiments, the polyurethane sealant may have an elongation of about 200 percent or greater. In yet other embodiments, the polyurethane sealant may have an elongation of about 300 percent or greater.

The subject sealant or adhesive provides excellent paintability, defined as a high level of adhesion between the sealant and an applied paint that can be measured by ASTM D 3359. In certain embodiments, the polyurethane sealant reaction product is paintable such that paint adheres to the surface of the sealant with a rating of at least 3B when tested according to the paint adhesion test ASTM D3359. For purposes of illustration but not by way of limitation, the paint may be at least one of latex paint, solvent-borne paint, or solvent-free paint. Polyurethane sealants made according to the foregoing description demonstrate non-sag properties, primerless adhesion to concrete, good paint adhesion, low modulus, and high elongation properties for construction sealants.

It was not previously known to provide two component polyurethane systems having non-sag properties, primerless adhesion to concrete, good paint adhesion, low modulus, and high elongation, with a paint adhesion of at least about 3B when tested according to ASTM D3359, a non-sag value of about 0.0-0.1 B/S when tested according to ASTM D-2202, (that is, using a Frazier (Boeing) Flow Test Jig, i.e. Boeing Slump Gage or Jig, where 0.0=no slump, 0.254=slump of 0.254 cm (0.1=slump of 0.1 inch), and a primerless adhesion to concrete of at least about 22.2 N (5 lbf) when tested according to ASTM C794. This has been accomplished by using in certain embodiments, as Base Part A of an at least two part construction sealant or adhesive, an epoxy silane, a melamine compound, and a polyol, and as Activator Part B, xylenol and an isocyanate-terminated prepolymer of aromatic diisocyanate and polyol. Optionally Part B may include epoxy silane or a mixture of epoxy silane and melamine compound.

In certain embodiments, the amount of base component Part A and activator component Part B used is sufficient to provide a ratio of isocyanate equivalents to the sum of polyol and amine equivalents of about 1:1 to about 1.5:1. In other embodiments, the NCO/(OH+NH) ratio may be about 1.15:1 to about 1.4:1. The percent excess NCO in the Part B Activator component may be about 2% to 10%, optionally 5% to about 7%.

In certain embodiments, the weight ratio of base component Part A to activator component Part B may be about 20:1 to about 1:20. In other embodiments, the weight ratio of base component Part A to activator component Part B may be about 10:1 to about 1:10. In yet other embodiments, the weight ratio of base component Part A to activator component Part B may be about 6:1 to about 1:6. The intermediates and pure diphenylmethane diisocyanate added to the activator component Part B may be considered to be part of the activator component. In some embodiments, the weight ratio of base component Part A to activator component Part B may be about 3.6:1 to 2.1:1, optionally in the range of about 2.7:1 to 2:1.

The following specific examples are provided to illustrate, but not limit, the preparation of the two component polyurethane formulations as discussed above.

Examples were prepared using the following components:

BzCl is benzoyl chloride, a strong Lewis acid used to retard reaction of urethane prepolymer and isocyanate with moisture, available from Sigma-Aldrich Corp., St. Louis, Mo.

Dabco® 33LV is a tertiary amine catalyst solution of 33% triethylenediamine and 67% dipropylene glycol, available from Air Products and Chemicals. Inc., Allentown. Pa. Dabco® T-12 catalyst is dubutyltindilaurate (DBTDL), a high boiling liquid organotin compound available from Air Products and Chemicals, Inc., Allentown, Pa.

DMDEE is 2,2-dimorpholino diethylether, an amine catalyst available from BASF Corporation (Florham Park, N.J.).

Drikalite® is a fine particle size ground marble available from Imerys Pigments Inc., Roswell, Ga. Supercoat® is an ultra-fine particle size ground marble available from Imerys Pigments Inc., Roswell, Ga.

Dynasylan® GLYMO silane is 3-glycidyloxypropyltrimethoxysilane available from Evonik Degussa Corporation, Parsipanny, N.J.

2-Ethylhexanoic acid is available from BASF Corporation, Freeport, Tex.

Expancel® 551 DE 40 d42 expandable microspheres have particles sizes of 30-50 microns and Expancel® 920 DET 40 d25 microspheres have particle sizes from 35-55 microns, Expancel® 461 DET 40 d25 microspheres have particle sizes from 35-55 microns, and all are available from AkzoNobel, Duluth, Ga.

K-Kat® 348 is a bismuth carboxylate catalyst available from King Industries, Norwalk Conn.

Irganox® 1135 is a phenolic antioxidant and heat stabilizer available from BASF Corporation, Florham Park, N.J. Lowinox® 44B25 is a phenolic antioxidant available from Chemtura Corporation, Middlebury, Conn.

Lupranate® M10 isocyanate is a solvent-free polymeric methylene diphenyl diisocyanate (MDI) with a functionality of approximately 2.3 which contains a relatively high level of pure MDI, available from BASF Corporation, Wyandotte, Mich. Lupranate® MI isocyanate is pure diphenylmethane diisocyanate with a functionality of 2.0, available from BASF Corporation, Wyandotte, Mich. Lupranate® T80 toluene diisocyanate (TDI) is an 80%-20% mixture of the 2,4 and 2,6 isomers of toluene diisocyanate, available from BASF Corporation, Wyandotte, Mich.

Multranol® 9168 is a polyether polyol available from Bayer MaterialScience, Pittsburgh, Pa.

Palatinol® DPHP decyl phthalate plasticizer is di-(2-propyl heptyl) phthalate, available from BASF Corporation, Houston, Tex.

Piperazine is diethylenediamine available from BASF SE. Germany.

Pluracol® 220 is a 6.000 molecular weight primary hydroxyl terminated polyol, available from BASF Corporation, Wyandotte, Mich. Pluracol® P1010 is a 1,000 molecular weight polypropylene glycol, available from BASF Corporation, Wyandotte, Mich. Pluracol® 726 is a polyol which is a 3,000 molecular weight propylene oxide adduct of glycerine, available from BASF Corporation, Wyandotte, Mich.

PTSI is p-toluenesulfonyl isocyanate, a storage stabilizer that acts as a scavenger for water and other isocyanate reactive groups, available from VanDeMark Chemical, Inc., Lockport, N.Y.

Quicklime is calcium oxide available from Specialty Minerals, Inc., Bethlehem, Pa. Ultra-Pflex® is a precipitated calcium carbonate available from Specialty Minerals, Inc., Bethlehem, Pa.

Resimene® 747 melamine is hexamethoxymethyl-melamine-formaldehyde resin, available from INEOS Melamines, Inc., Marietta, Ga.

Tinuvin® 328 and Tinuvin® 571 are benzotriazole light stabilizers available from BASF Corporation, Florham Park, N.J. Tinuvin® 765 is a hindered amine light stabilizer (HALS) available from BASF Corporation, Florham Park, N.J.

TiO$_2$ is titanium dioxide, available from DuPont, Wilmington, Del.

2,5-Xylenol is 2,5-dimethylphenol available from Sichuan Hongguang and Taizhou Hiday, China.

A number of different paints were used for paintability testing. A-100® is an acrylic latex paint available from The Sherwin-Williams Company, Cleveland, Ohio. Colorflex™ is a water-based acrylic elastomeric coating available from BASF Corporation, Shakopee, Minn. PVA Primer is a polyvinyl acetate latex primer available from The Valspar Corp., Wheeling, Ill. Thoro® 20 is a solvent-based high-build acrylic copolymer waterproofing sealer available from BASF Corporation, Shakopee, Minn. Thoro® 35 is a waterborne high-build acrylic copolymer waterproofing sealer available from BASF Corporation, Shakopee, Minn.

Part A Base Samples were prepared according to the following examples.

The piperazine/DPHP premix for Base A contained the following components, and was baked in an oven overnight:

| | | Wt % |
|---|---|---|
| I | Palatinol ® DPHP | 11.600 |
| II | Piperazine | 1.130 |

Preparation Of Base A

| | Base A Components | Wt % |
|---|---|---|
| 1 | Pluracol ® 220 | 28.106 |
| 2 | Pluracol ® 726 | 3.500 |
| 3 | Multranol ® 9168 | 1.700 |
| 4 | Tinuvin ® 328 | 0.348 |
| 5 | Lowinox ® 44B25 | 0.348 |
| 6 | Ultra-Pflex ®, dried | 30.937 |
| 7 | Supercoat ®, dried | 20.015 |
| 8 | Piperazine/DPHP premix | 12.730 |
| 9 | Expancel ® 551 DE 40 d42 | 1.149 |
| 10 | Expancel ® 551 DE 40 d42 | 1.149 |
| 11 | T-12 Catalyst | 0.018 |
| | Total Weight | 100.000 |

The piperazine/DPHP premix for Base B contained the following components, and was baked in an oven overnight:

| | | Wt |
|---|---|---|
| I | Palatinol ® DPHP | 11.600 |
| II | Piperazine | 1.210 |

Preparation Of Base B

| | Base B Components | Wt % |
|---|---|---|
| 1 | Pluracol ® 220 | 28.596 |
| 2 | Pluracol ® 726 | 3.500 |
| 3 | Multranol ® 9168 | 1.700 |
| 4 | Tinuvin ® 328 | 0.348 |
| 5 | Lowinox ® 44B25 | 0.348 |
| 6 | Ultra-Pflex ®, dried | 30.936 |
| 7 | Supercoat ®, dried | 20.262 |
| 8 | Piperazine/DPHP premix | 12.810 |
| 9 | Expancel ® 551 DE 40 d42 | 0.741 |
| 10 | Expancel ® 551 DE 40 d42 | 0.741 |
| 11 | T-12 Catalyst | 0.018 |
| | Total Weight | 100.000 |

Synthesis Procedure for Bases A and B:

Items 1-5 were added, mixed to wet out, Items 6-7 were added, heated to 82° C. (180° F.), mixed, and cooled to 43° C. (110° F.). Item 8 was added, mixed, Items 9 and 10 were added and mixed, Item 11 was added and mixed well, and the mixture packaged.

The piperazine/DPHP premix for Base C contained the following components, and was prepared in glass container:

| | | Wt % |
|---|---|---|
| I | Palatinol ® DPHP | 12.130 |
| II | Piperazine | 0.930 |
| III | Irganox ® 1135 | 0.500 |

Preparation Of Base C

| | Base C Components | Wt % |
|---|---|---|
| 1 | Pluracol ® 220 | 32.631 |
| 2 | Pluracol ® 726 | 1.000 |
| 3 | Resimene ® 747 | 1.418 |
| 4 | Tinuvin ® 571 | 0.250 |
| 5 | Tinuvin ® 765 | 0.250 |
| 6 | TiO$_2$, dried | 2.000 |
| 7 | Quicklime | 1.140 |
| 8 | Ultra-Pflex ®, dried | 30.000 |
| 9 | Supercoat ®, dried | 16.464 |
| 10 | Piperazine/DPHP premix | 13.560 |
| 11 | Expancel ® 461 DET 40 d25 | 0.528 |
| 12 | Expancel ® 461 DET 40 d25 | 0.527 |
| 13 | T-12 Catalyst | 0.020 |
| | Total Weight | 99.788 |

Synthesis Procedure for Base C:

Items 1-5 were added, mixed to wet out, Items 6-9 were added, heated to 71° C. (160° F.), mixed, and cooled to 143° C. (110° F.). Item 10 was added, mixed, Items 11 and 12 were added and mixed, Item 13 was added and mixed well, and the mixture packaged.

The piperazine/DPHP premix for Base D contained the following components, and was prepared in glass container:

|     |                      | Wt %   |
| --- | -------------------- | ------ |
| I   | Palatinol ® DPHP     | 12.430 |
| II  | Piperazine           | 0.930  |
| III | Irganox ® 1135       | 0.500  |

| Preparation Of Base D | | |
| --- | --- | --- |
| | Base D Components | Wt % |
| 1  | Pluracol ® 220            | 34.672  |
| 2  | Resimene ® 747            | 1.418   |
| 3  | Dynasylan ® GLYMO silane  | 0.212   |
| 4  | Tinuvin ® 571             | 0.250   |
| 5  | Tinuvin ® 765             | 0.250   |
| 6  | TiO$_2$, dried            | 2.000   |
| 7  | Quicklime                 | 1.140   |
| 8  | Ultra-Pflex ®, dried      | 31.900  |
| 9  | Supercoat ®, dried        | 13.000  |
| 10 | Piperazine/DPHP premix    | 13.860  |
| 11 | Expancel ® 920 DET 40 d25 | 0.638   |
| 12 | Expancel ® 920 DET 40 d25 | 0.637   |
| 13 | T-12 Catalyst             | 0.023   |
|    | Total Weight              | 100.000 |

Synthesis Procedure for Base D:

Items 1-5 were added, mixed to wet out, Items 6-9 were added, heated to 71° C. (160° F.), mixed, and cooled to 43° C. (110° F.). Item 10 was added, mixed, Items 11 and 12 were added and mixed, Item 13 was added and mixed well, and the mixture packaged.

The piperazine/DPHP premix for Base E was prepared in glass container by ultrasonic grinding:

|    |                  | Wt %  |
| -- | ---------------- | ----- |
| I  | Palatinol ® DPHP | 7.430 |
| II | Piperazine       | 0.985 |

| Preparation Of Base E | | |
| --- | --- | --- |
| | Base E Components | Wt % |
| 1  | Pluracol ® 220            | 32.743  |
| 2  | Palatinol ® DPHP          | 5.000   |
| 3  | Multranol ® 9168          | 3.050   |
| 4  | Expancel ® 920 DET 40 d25 | 0.701   |
| 5  | Expancel ® 920 DET 40 d25 | 0.701   |
| 6  | Irganox ® 1135            | 0.500   |
| 7  | Tinuvin ® 571             | 0.250   |
| 8  | Tinuvin ® 765             | 0.250   |
| 9  | Ultra-Pflex ®, un-dried   | 35.884  |
| 10 | Supercoat ®, un-dried     | 9.683   |
| 11 | PTSI                      | 0.500   |
| 12 | Resimene ® 747            | 1.418   |
| 13 | Dynasylan ® GLYMO silane  | 0.212   |
| 14 | Quicklime                 | 1.140   |
| 15 | Piperazine/DPHP premix    | 8.415   |
| 16 | T-12 Catalyst             | 0.023   |
| 17 | 2-Ethylhexanoic acid      | 0.030   |
|    | Total Weight              | 100.500 |

Synthesis Procedure for Base E:

Add Items 1-3 were added, mixed to wet out. Items 4-5 were added and mixed. Items 6-10 were added, heated to 60° C. (140° F.), and mixed. Item 11 was added, mixed, Items 12-14 were added and mixed, and cooled to 43° C. (110° F.). Item 15 was added, mixed, Items 16-17 were added, mixed well, and packaged.

| Preparation Of Base F | | |
| --- | --- | --- |
| | Base F Components | Wt % |
| 1  | Pluracol ® 220            | 27.728  |
| 2  | Pluracol ® 726            | 11.200  |
| 3  | Multranol ® 9168          | 1.280   |
| 4  | Palatinol ® DPHP          | 10.400  |
| 5  | Irganox ® 1135            | 0.340   |
| 6  | Tinuvin ® 571             | 0.276   |
| 7  | Tinuvin ® 765             | 0.276   |
| 8  | Resimene ® 747            | 1.375   |
| 9  | Dynasylan ® GLYMO silane  | 0.205   |
| 10 | TiO$_2$, dried            | 2.520   |
| 11 | Quicklime                 | 1.075   |
| 12 | Ultra-Pflex ®, dried      | 5.334   |
| 13 | Drikalite ®, dried        | 36.613  |
| 14 | Expancel ® 551 DE 40 d42  | 0.661   |
| 15 | Expancel ® 551 DE 40 d42  | 0.660   |
| 16 | T-12 Catalyst             | 0.011   |
| 17 | 2-Ethylhexanoic acid      | 0.046   |
|    | Total Weight              | 100.000 |

Synthesis Procedure for Base F

Items 1-9 were added, and mixed to wet out. Items 10-13 were added, heated to 71° C. (160° F.), mixed, and cooled to 49° C. (120° F.). Items 14-15 were added, mixed. Items 16-17 were added, mixed well, and packaged.

| Preparation Of Base G: | | |
| --- | --- | --- |
| | Base G Components | Wt % |
| 1  | Pluracol ® 220            | 30.000  |
| 2  | Pluracol ® 726            | 12.356  |
| 3  | Multranol ® 9168          | 1.436   |
| 4  | Palatinol ® DPHP          | 11.140  |
| 5  | Irganox ® 1135            | 0.370   |
| 6  | Tinuvin ® 571             | 0.300   |
| 7  | Tinuvin ® 765             | 0.300   |
| 8  | TiO$_2$, dried            | 4.795   |
| 9  | Quicklime                 | 1.170   |
| 10 | Ultra-Pflex ®, dried      | 5.808   |
| 11 | Drikalite ®, dried        | 37.900  |
| 12 | Expancel ® 551 DE 40 d42  | 0.741   |
| 13 | Expancel ® 551 DE 40 d42  | 0.740   |
| 14 | T-12 Catalyst             | 0.0116  |
| 15 | 2-Ethylhexanoic acid      | 0.050   |
|    | Total Weight              | 107.118 |

Synthesis Procedure for Base G:

Items 1-7 were added, and mixed to wet out. Items 8-11 were added, heated to 71° C. (160° F.), mixed, and cooled to 49° C. (120° F.). Items 12-13 were added, mixed, Items 14-15 were added, mixed well, and packaged.

| Preparation Of Base H: | | |
| --- | --- | --- |
| | Base H Components | Wt % |
| 1 | Pluracol ® 220           | 25.122 |
| 2 | Pluracol ® 726           | 11.550 |
| 3 | Multranol ® 9168         | 3.500  |
| 4 | Palatinol ® DPHP         | 10.400 |
| 5 | Irganox ® 1135           | 0.340  |
| 6 | Tinuvin ® 571            | 0.276  |
| 7 | Tinuvin ® 765            | 0.276  |
| 8 | Resimene ® 747           | 1.375  |
| 9 | Dynasylan ® GLYMO silane | 0.205  |

| Preparation Of Base H: | | |
|---|---|---|
| | Base H Components | Wt % |
| 10 | TiO₂, dried | 2.120 |
| 11 | Quicklime | 1.075 |
| 12 | Ultra-Pflex ®, dried | 5.334 |
| 13 | Drikalite ®, dried | 37.013 |
| 14 | Expancel ® 551 DE 40 d42 | 0.680 |
| 15 | Expancel ® 551 DE 40 d42 | 0.680 |
| 16 | T-12 Catalyst | 0.011 |
| 17 | 2-Ethylhexanoic acid | 0.043 |
| | Total Weight | 100.000 |

Synthesis Procedure for Base H:

Items 1-9 were added, and mixed to wet out. Items 10-13 were added, heated to 71° C. (160° F.), mixed, and cooled to 49° C. (120° F.). Items 14-15 were added, mixed, Items 16-17 were added, mixed well, and packaged.

Intermediate prepolymers were prepared according to the following examples.

| Preparation Of Intermediate Prepolymer Sample K: | | |
|---|---|---|
| | Intermediate Sample K Components | Wt % |
| 1 | 2,5-Xylenol | 22.243 |
| 2 | Palatinol ® DPHP | 51.978 |
| 3 | Lupranate ® M10 | 25.535 |
| 4 | Dabco ® 33LV, 50% in Palatinol ® DPHP | 0.040 |
| 5 | Dabco ® 33LV, 50% in Palatinol ® DPHP | 0.040 |
| 6 | PTSI | 0.165 |
| | Total Weight | 100.000 |
| | Prepolymer NCO %, Final | 0.524 |

Xylenol and DPHP were added, mixed, and nitrogen purged. Lupranate® M10 and Dabco® 33LV (50%) were added, mixed, heated to 85° C. to react for 2-5 hours, and cooled down. PTSI was added, mixed, and the mixture packaged.

| Preparation Of Intermediate Prepolymer Sample L: | | |
|---|---|---|
| | Intermediate Sample L Components | Wt % |
| 1 | 2,5-Xylenol | 17.243 |
| 2 | Palatinol ® DPHP | 62.773 |
| 3 | Lupranate ® M10 | 19.795 |
| 4 | Dabco ® 33LV, 50% in Palatinol ® DPHP | 0.031 |
| 5 | Dabco ® 33LV, 50% in Palatinol ® DPHP | 0.031 |
| 6 | PTSI | 0.128 |
| | Total Weight | 100.000 |
| | Prepolymer NCO %, Final | 0.406 |

The intermediate synthesis procedure for Intermediate Prepolymer Sample K set forth above, was repeated for Intermediate Prepolymer Sample L.

Part B samples of NCO terminated prepolymer activator were prepared according to the following examples.

| Preparation Of Activator M | | |
|---|---|---|
| | Activator M Components | Wt % |
| 1 | Pluracol ® 726 | 26.050 |
| 2 | Pluracol ® P1010 | 49.450 |
| 3 | BzCl, 2% in Pluracol ® 726 | 0.180 |
| 4 | Lupranate ® T80 | 21.176 |
| 5 | Dabco ® 33LV, 50% in Pluracol ® 726 | 0.140 |
| 6 | Lupranate ® MI | 3.282 |
| 7 | PTSI | 0.240 |
| | Total Weight | 100.518 |
| | Percent Excess NCO | 5.998 |

Synthesis Procedure for Activator M:

Pluracol® 726, Pluracol® P 1010, and BzCl were added, mixed, and heated. Lupranate® T80 and Dabco® 33LV were added, reacted for 2-5 hours, and cooled down. Lupranate® MI and PTSI were added, mixed, and packaged.

| Preparation Of Activator N | | |
|---|---|---|
| | Activator N Components | Wt % |
| 1 | Pluracol ® 726 | 16.170 |
| 2 | Pluracol ® P1010 | 30.696 |
| 3 | BzCl, 2% in Pluracol ® 726 | 0.112 |
| 4 | Lupranate ® T80 | 13.145 |
| 5 | Dabco ® 33LV, 50% in Pluracol ® 726 | 0.070 |
| 6 | Lupranate ® MI | 6.539 |
| 7 | PTSI | 0.149 |
| 8 | Silane Adduct | 10.289 |
| 9 | Intermediate K | 22.830 |
| | Total Weight | 100.000 |
| | Percent Excess NCO | 5.786 |

Synthesis Procedure for Activator N:

Pluracol® 726, Pluracol® P1010, and BzCl were added, mixed, and heated. Lupranate® T80 and Dabco® 33LV were added, reacted for 2-5 hours, and cooled down. Lupranate® MI, PTSI, silane adduct, and Intermediate K were added, mixed, and packaged.

| Preparation Of Activator O | | |
|---|---|---|
| | Activator O Components | Wt % |
| 1 | Pluracol ® 726 | 17.372 |
| 2 | Pluracol ® P1010 | 32.977 |
| 3 | BzCl, 2% in Pluracol ® 726 | 0.120 |
| 4 | Lupranate ® T80 | 14.122 |
| 5 | Dabco ® 33LV, 50% in Pluracol ® 726 | 0.075 |
| 6 | Lupranate ® MI | 7.266 |
| 7 | PTSI | 0.160 |
| 8 | Intermediate L | 27.908 |
| | Total Weight | 100.000 |
| | Prepolymer NCO %, Final | 5.873 |

Synthesis Procedure for Activator O:

Pluracol® 726, Pluracol® P1010, and BzCl were added, mixed, and heated. Lupranate® T80 and Dabco® 33LV were added, reacted for 2-5 hours, and cooled down. Lupranate® MI, PTSI, and Intermediate L were added, mixed, and packaged.

Preparation Of Activator P

| | Activator P Components | Wt % |
|---|---|---|
| 1 | Pluracol ® 726 | 17.266 |
| 2 | Pluracol ® P1010 | 32.776 |
| 3 | BzCl, 2% in Pluracol ® 726 | 0.119 |
| 4 | Lupranate ® T80 | 14.036 |
| 5 | Dabco ® 33LV, 50% in Pluracol ® 726 | 0.074 |
| 6 | Lupranate ® MI | 7.221 |
| 7 | PTSI | 0.159 |
| 8 | Dynasylan ® GLYMO silane | 0.611 |
| 9 | Intermediate L | 27.738 |
| | Total Weight | 100.000 |
| | Prepolymer NCO %, Final | 5.837 |

Synthesis Procedure for Activator P:

Pluracol® 726, Pluracol® P1010, and BzCl were added, mixed, and heated. Lupranate®T80 and Dabco® 33LV were added, reacted for 2-5 hours, and cooled down. Lupranate® MI, PTSI, GLYMO silane, and Intermediate L were added, mixed, and packaged.

Preparation Of Activator R

| | Activator R Components | Wt % |
|---|---|---|
| 1 | Pluracol ® 726 | 17.912 |
| 2 | Pluracol ® P1010 | 34.000 |
| 3 | 2,5-Xylenol | 4.962 |
| 4 | Palatinol ® DPHP | 14.957 |
| 5 | BzCl, 2% in Pluracol ® 726 | 0.124 |
| 6 | Lupranate ® T80 | 14.561 |
| 7 | Lupranate ® M10 | 5.696 |
| 8A | Dabco ® 33LV, 50% in Pluracol ® 726 | 0.048 |
| 8B | Dabco ® 33LV, 50% in Pluracol ® 726 | 0.048 |
| 9 | Lupranate ® MI | 7.491 |
| 10 | PTSI | 0.202 |
| | Total Weight | 100.000 |
| | Prepolymer NCO %, Final | 6.021 |

Synthesis Procedure for Activator R:

Pluracol® 726, Pluracol® P1010, 2,5-xylenol, Palatinol® DPHP, and BzCl were added, mixed, and heated. Lupranate® T80, Lupranate® M10, and Dabco® 33LV were added, reacted for 2-5 hours, and cooled down. Lupranate® MI, and PTSI, were added, mixed, and packaged.

Preparation Of Activator S

| | Activator S Components | Wt % |
|---|---|---|
| 1 | 2,5-Xylenol | 4.865 |
| 2 | Palatinol ® DPHP | 14.667 |
| 3 | Lupranate ® M10 | 5.585 |
| 4 | Dabco ® 33LV, 50% in Pluracol ® 726 | 0.047 |
| 5 | Lupranate ® T80 | 14.279 |
| 6 | BzCl, 2% in Pluracol ® 726 | 0.118 |
| 7 | Pluracol ® 726 | 17.564 |
| 8 | Pluracol ® 1010 | 33.341 |
| 9 | Dabco ® 33LV, 50% in Pluracol ® 726 | 0.032 |
| 10 | Lupranate ® MI | 9.326 |
| 11 | PTSI | 0.176 |
| | Total Weight | 100.000 |
| | Prepolymer NCO %, Final | 6.570 |

Synthesis Procedure for Activator S:

2,5-xylenol and Palatinol® DPHP were added and mixed, Lupranate® M 10 and Dabco® 33LV were added, heated, mixed, and reacted for 2-5 hours. Lupranate® T80 and BzCl were added and mixed, Pluracol® 726, Pluracol® P1010 and Dabco® 33LV were added, reacted for 2-5 hours, and cooled down. Lupranate® MI, and PTSI were added, mixed, and packaged.

Preparation Of Activator T

| | Activator T Components | Wt % |
|---|---|---|
| 1 | 2,5-Xylenol | 4.962 |
| 2 | Palatinol ® DPHP | 14.957 |
| 3 | Lupranate ® M10 | 5.696 |
| 4 | Dabco ® 33LV, 50% in Pluracol ® 726 | 0.048 |
| 5 | Lupranate ® T80 | 14.561 |
| 6 | BzCl, 2%, in Pluracol ® 726 | 0.124 |
| 7 | Pluracol ® 726 | 17.912 |
| 8 | Pluracol ® 1010 | 34.000 |
| 9 | Dabco ® 33LV, 50% in Pluracol ® 726 | 0.048 |
| 10 | Lupranate ® MI | 7.491 |
| 11 | PTSI | 0.202 |
| | Total Weight | 100.000 |
| | Prepolymer NCO %, Final | 6.02 |

Activator T was Made According to the Synthesis Procedure for Activator S.

Part A Base samples were combined with Part B Activator samples according to the following examples, and evaluated with respect to paintability, non-sag and viscosity properties, tensile and elongation properties, and adhesion in peel properties as a demonstration of primerless adhesion on concrete.

Paintability was evaluated using a standard paint adhesion test method such as ASTM D3359 Standard Test Methods for Measuring Adhesion by Tape Test. Using this crosshatch adhesion test method, a rating of 5B is given to the sample if the edges of the cuts are completely smooth and none of the squares of the lattice is detached, therefore 0% adhesion failure. A rating of 4B applies if small flakes of the coating are detached at intersections of cuts, and less than 5% of the area is affected, therefore 5% adhesion failure. A rating of 3B applies if small flakes of the coating are detached along edges and at intersections of cuts, and the adhesion failure area is 5 to 15% of the lattice. A rating of 2B applies if the coating has flaked along the edges and on parts of the squares, and the adhesion failure area is 15 to 35% of the lattice. A rating of 1B applies if the coating has flaked along the edges of cuts in large ribbons and whole squares have detached, and the adhesion failure area is 35 to 65% of the lattice. A rating of 0B applies if flaking and detachment is worse than Grade 1B, corresponding to adhesion failure area of greater than 65% of the lattice.

Tensile and elongation properties were evaluated using ASTM D412 Standard Test Methods for Vulcanized Rubber and Thermoplastic Elastomers—Tension, with the polyurethane sealants demonstrating high elongations of at least 200% or greater, and low moduli of about 275-970 kPa (40-140 psi). Non-sag properties were demonstrated by testing according to ASTM Method D2202 Standard Test Method For Slump Of Sealants, with the polyurethane sealants demonstrating non-sag properties of 0.0-0.1 B/S. Viscosity properties were evaluated using Brookfield DV-II+ viscometer, spindle #96, waiting for 36 seconds before taking reading, resulting in 500 to 3,000 Pa·s (5,000 to 30,000 poise). Primerless adhesion on concrete was demonstrated by testing according to ASTM C794 Standard Test Method for Adhesion-in-Peel of Elastomeric Joint Sealants, with cohesive failure at a load range of a peel strength of at least 22.2 N or 5 lbf, leaving portions of the sealant attached to both surfaces.

The Examples in Table 1 were prepared by mixing the following components:

Example 1 was prepared by mixing 64.16 g of Base A and 34 vol. % Expancel® 551DE40 d42 (included in Base) with 19.25 g of Activator M and 6.1 g Color Pack, 1.3 g silane, 6.54 g Intermediate K, and 2.65 g Lupranate® MI. ("Color Pack" is an optional Part C, comprising a mixture of pigments and polyols.)

Example 2 was prepared by mixing 63.15 g Base A and 34 vol. % Expancel® 551 DE40 d42 (included in Base) with 19.14 g Activator M and 6.1 g Color Pack, 1.64 g silane, 6.91 g Intermediate K, and 3.06 g Lupranate® MI.

Example 3 was prepared by mixing 64.56 g Base A and 34 vol. % Expancel® 551 DE40 d42 (included in Base) with 45.45 g Activator N and 6.1 g Color Pack.

Example 4 was prepared by mixing 66.02 g Base B and 25 vol. % Expancel® 551 DE40 d42 (included in Base) with 16.31 g Activator M and 6.1 g Color Pack, 1.31 g silane, 6.73 g Intermediate K, and 3.53 g Lupranate® MI.

Example 5 was prepared by mixing 65.08 g Base B and 25 vol. % Expancel® 551 DE40 d42 (included in Base) with 17.73 g Activator M and 6.1 g Color Pack, 1.31 g silane, 6.59 g Intermediate K, and 3.2 g Lupranate® MI.

Example 6 was prepared by mixing 72.36 g Base A and 34 vol. % Expancel® 551 DE40 d42 (included in Base) with 19.54 g Activator M, and 6.1 g Color Pack and 2.01 g Lupranate® MI.

Bases and Activators were prepared, optionally including low molecular weight polyols having a molecular weight of not less than 400. Modification of the polyurethane structure with short chain polyols and the presence of aromatic diisocyanates such as MDI may enhance achieving paintability. Further enhancement of paintability may be achieved by the addition of polar groups, such as urea moieties from the reaction of isocyanate and amine, such as diamine.

In Example 6, no epoxy silane or intermediate prepolymer was included, and paintability readings were below the others. Epoxy silane and intermediate prepolymer adhesion promoters, may also be helpful for paintability.

The examples in Table 2 were prepared by mixing the following components: Example 7 was prepared by mixing 68.76 g Base E and 34 vol. % Expancel® 920 DET 40 d25 (included in Base) with 31.24 g Activator T. Example 8 was prepared by mixing 71.77 g Base E and 34 vol. % Expancel® 920 DET 40 d25 (included in Base) with 28.23 g Activator S.

TABLE 2

|  | Ex. 7 | Ex. 8 |
|---|---|---|
| Base | E | E |
| Activator | T | S |
| NCO/(OH + NH) | 1.35 | 1.35 |
| Expancel 920 DET 40 d25, Volume % | 34 | 34 |
| Paintability Properties | | |
| A-100 ® | 5B | 5B |
| Colorflex ™ | 5B | 5B |
| PVA Primer | 5B | 5B |
| Thoro ® 20 | 5B | 5B |
| Thoro ® 35 | 4B | 4.5B |

TABLE 1

|  | Ex. 1 | Ex. 2 | Ex. 3 | Ex. 4 | Ex. 5 | Ex. 6 |
|---|---|---|---|---|---|---|
| Base | A | A | A | B | B | A |
| Activator | M | M | N | M | M | M |
| NCO/(OH + NH) | 1.22 | 1.23 | 1.29 | 1.22 | 1.22 | 1.29 |
| Expancel 551 DE 40 d42, Volume % | 34 | 34 | 34 | 25 | 25 | 34 |
| Paintability Properties | | | | | | |
| A-100 ® (avg.) | 4B, 3B, 3B (3.33) | 5B, 5B, 5B (5) | 4B, 5B, 4B (4.33) | 5B, 5B, 5B (5) | 3B, 5B, 5B, 5B, 4B (4.4) | 5B, 5B (5) |
| Colorflex ™ (avg.) | 5B, 5B (5) | 5B, 5B, 4B, 3B (4.25) | 5B, 4B, 5B (4.66) | 5B, 5B, 5B (5) | 5B, 5B, 5B (5) | 5B, 5B (5) |
| PVA Primer (avg.) | 5B, 5B (5) | 5B, 5B (5) | 5B, 5B (5) | 4B, 5B, 5B (4.67) | 5B, 5B, 5B (5) | 3B, 4B, 3B, 3B (3.25) |
| Thoro ® 20 (avg.) | 5B, 5B (5) | 5B, 5B (5) | 5B, 5B (5) | 5B, 5B, 5B (5) | 5B, 5B, 4B (4.66) | 2B, 2B, 2B (2) |
| Thoro ® 35 (avg.) | 5B, 5B (5) | 4B, 4B, 5B (4.33) | 5B, 5B (5) | 5B, 5B, 5B (5) | 5B, 5B, 5B (5) | 4B, 4B, 5B (4.33) |
| Non-sag and Viscosity Properties | | | | | | |
| Non-Sag | 0.03 | 0.09 | 0.0 | 0.1 | 0.07 | 0.0 |
| Viscosity, poise | — | — | — | 6,240 | 9,600 | 33,000 |
| Viscosity, Pa·s | — | — | — | 624 | 960 | 3,300 |
| Tensile And Elongation Properties | | | | | | |
| Cure Days | 13 | 13 | 13 | 11 | 11 | 9 |
| Tensile Strength, psi | 184.9 | 197.7 | 63.9 | 203.8 | 209.3 | 214.7 |
| Tensile Strength, kPa | 1,275 | 1,363 | 441 | 1,405 | 1,443 | 1,480 |
| 100% Modulus, psi | 84.2 | 125.8 | 39.9 | 80.2 | 82.5 | 136 |
| 100% Modulus, kPa | 581 | 867 | 275 | 553 | 569 | 938 |
| Elongation | 285% | 209% | 213% | 357% | 355% | 212% |
| Hardness | 29.6 | 34.2 | 23.6 | 27.7 | 26.6 | 35.1 |

TABLE 2-continued

|  | Ex. 7 | Ex. 8 |
|---|---|---|
| Non-sag and Viscosity Properties | | |
| Non-Sag | 0.04 | 0.01 |
| Viscosity, poise | 4,480 | 4,640 |
| Viscosity, Pa · s | 448 | 464 |
| Tensile And Elongation Properties | | |
| Cure Days | 10 | 10 |
| Tensile Strength, psi | 121.8 | 128.4 |
| Tensile Strength, kPa | 839.8 | 885.3 |
| 100% Modulus, psi | 60.5 | 67.3 |
| 100% Modulus, kPa | 417 | 464 |
| Elongation | 485% | 366% |
| Hardness | 22.5 | 25.6 |

Color stable microspheres such as Expancel 920 DET 40 d25 may be used to prepare sealants, with paintability readings remaining very good. Various demonstrated adhesion promoting combinations, such as those of epoxy silane, melamine compound, and/or intermediate prepolymers, used in the sealants also held paintability well.

The Examples in Table 3 were prepared by mixing the following components: Intermediate U was prepared by mixing 13% Dynasylan® GLYMO silane and 87% Resimene® 747, and keeping in 60° C. oven overnight. Intermediate V was prepared by mixing 4.198% Intermediate U, 19.432% Intermediate K, 8.978% Lupranate® MI, and 67.391% Activator M.

In certain embodiments, Part A may comprise epoxy silane and a melamine compound, while Part B comprises the reaction product of xylenol and isocyanate. Part B may also comprise epoxy silane and melamine compounds. Commercial melamine compounds may not be 100% pure, and may still have some amine reactivity. A melamine compound may be included in Part A. A melamine compound may also be mixed with epoxy silane first, then the mixture combined into Part B. Epoxy silane can be included in Part A or Part B.

Example 9 was prepared by mixing 185.09 g Base G with 3.05 g Intermediate U, 14 g Intermediate K, 2.93 g Lupranate® MI, and 44.93 g Activator M (44.93 g). Primerless adhesion to concrete was accomplished by the addition of epoxy silane, a melamine compound, and reaction product of xylenol and isocyanate.

Example 10 was prepared by mixing 199.82 g Base G with 50.29 g of Intermediate V. In Example 10, Part B (Activator, Intermediate V) comprised epoxy silane, melamine compound, and the reaction product of xylenol and isocyanate. Primerless adhesion performance remained very good.

TABLE 3

| | Avg Load @ Avg Value | | |
|---|---|---|---|
| Sample | (5 peaks + troughs) (lbf) | N | % Loss in Bond (Pass/Fail) |
| 9 | 27.88 ± 2.30 | 124.0 ± 10.2 | Pass, 100% cohesive failure |
| 10 | 25.43 ± 0.63 | 113.1 ± 2.80 | Pass, 100% cohesive failure |

The Examples in Table 4 were prepared by mixing the following components:

Example 11 Sealant had an NCO/OH ratio of 1.42 and was prepared by mixing 113.87 g Base F with 37.19 g Activator O.

Example 12 Sealant had an NCO/(OH+NH) ratio of 1.24 and was prepared by mixing 107.73 g Base D with 42.27 g Activator O.

Example 13 Sealant had an NCO/(OH+NH) ratio of 1.25 and was prepared by mixing 107.62 g Base C with 42.38 g Activator P.

TABLE 4

| | Avg Load @ Avg Value | | % Loss in Bond | | ASTM C-794 |
|---|---|---|---|---|---|
| Example Number | (5 peaks + troughs) (lbf) | N | Cohesive Failure | Adhesive Failure | Pass/Fail |
| 11 | 21.45 ± 1.99 | 95.41 ± 8.85 | 100 | 0 | Pass |
| 12 | 13.33 ± 1.42 | 59.29 ± 6.32 | 100 | 0 | Pass |
| 13 | 25.18 ± 4.08 | 112.0 ± 18.1 | 100 | 0 | Pass |

The Examples in Table 5 were prepared by mixing the following components:

Example 14 was prepared by mixing 114.5 g Base F with 35.5 g Activator R.

Example 15 was prepared by mixing 113.24 g Base H with 36.76 g Activator R.

Example 16 was prepared by mixing 108.61 g Base D with 41.39 g Activator R.

TABLE 5

| | | | Avg Load @ Avg Value | | |
|---|---|---|---|---|---|
| Example | Base (grams) | Activator R (grams) | (5 peaks + troughs) (lbf) | N | Loss in Bond |
| 14 | 114.5 F | 35.5 | 12.86 ± 1.32 | 57.20 ± 5.87 | 100% cohesive samples tacky |
| 15 | 113.24 H | 36.76 | 14.46 ± 2.05 | 64.32 ± 9.12 | 100% cohesive samples tacky |
| 16 | 108.61 D | 41.39 | 10.05 ± 0.94 | 44.70 ± 4.2 | 100% cohesive samples tacky |

In Examples 7-8, 11-12, and 14-16, Part A comprised epoxy silane and melamine compound, and Part B comprised the reaction product of xylenol and isocyanate. In Example 10, Part A comprised polyols, and Part B comprised a mixture of epoxy silane and a melamine compound, and the reaction product of xylenol and isocyanate. In Example 13, Part A comprised melamine compound, and Part B comprised epoxy silane and the reaction product of xylenol and isocyanate.

Various combinations of three reactive ingredients, such as epoxy silane, melamine compound, and the reaction product of xylenol and isocyanate provided unexpected primerless adhesion to concrete substrate.

In further embodiments, a two part construction sealant or adhesive is provided, comprising a base component Part A and an activator component Part B, wherein Part A comprises a polyol and an epoxy silane and/or a melamine compound; and, Part B comprises a prepolymer reaction product comprising the residues of xylenol or xylenol and an additional polyol, a polymeric isocyanate or a polymeric isocyanate and an aromatic diisocyanate, and an epoxy silane compound. Optionally, Part A additionally comprises a plasticizer.

In certain embodiments, the sealant or adhesive exhibits at least one of a non-sag value of about 0.0-0.3 B/S when tested according to ASTM D-2202, a primerless adhesion to concrete of at least about 22.2 N (5 lbf) when tested according to ASTM C794, a 100% modulus of less than about 970 kPa (140 psi) when tested according to ASTM D412, and an elongation to break of about 300% or greater when tested according to ASTM D412. In particular embodiments, the sealant or adhesive exhibits a primerless adhesion to concrete of about 88.8 N (20 lbf) to about 120 N (27 lbf), a 100% modulus of about 482 kPa (70 psi) to about 758 kPa (110 psi), and an elongation to break of about 315 to about 511% when tested according to the standards noted above.

In certain embodiments, the viscosity of the sealant or adhesive may be in the range of 500 Pa·s (5,000 poise) to 4,770 Pa·s (47,700 poise) at 24° C. (72° F.), and in certain embodiments from 1,100 Pa·s (11,000 poise) to 1,540 Pa·s (15,400 poise) at 24° C. (72° F.), as measured by Brookfield viscometer.

In certain embodiments, a polyurethane sealant or adhesive is provided, wherein the sealant or adhesive may have a 100 percent modulus of less than about 1,030 kPa (150 psi). In other embodiments, the polyurethane sealant may have a 100 percent modulus of about 482 kPa (70 psi) to about 758 kPa (110 psi).

In certain embodiments, the polyurethane sealant may have a tensile strength of about 550 kPa (80 psi) or greater. In other embodiments, the polyurethane sealant may have a tensile strength of about 970 kPa (140 psi) or greater, such as up to 1300 kPa (190 psi).

In certain embodiments, the polyurethane sealant may have an elongation at break of about 200 percent or greater. In other embodiments, the polyurethane sealant may have an elongation of about 300 percent or greater. In yet other embodiments, the polyurethane sealant may have an elongation of about 400 percent or greater.

It was not previously known to provide two component polyurethane systems having non-sag properties, primerless adhesion to concrete, low modulus, and high elongation, with a non-sag value of about 0.0-0.3 B/S when tested according to ASTM D-2202, (that is, using a Frazier (Boeing) Flow Test Jig, i.e. Boeing Slump Gage or Jig, where 0.0=no slump, 0.254=slump of 0.254 cm (0.1=slump of 0.1 inch), and a primerless adhesion to concrete of at least about 22.2 N (5 lbf) when tested according to ASTM C794. This has been accomplished by using in certain embodiments, as Base Part A of an at least two part construction sealant or adhesive, a polyol and, an epoxy silane compound and/or a melamine compound, and as Activator Part B, xylenol and an isocyanate-terminated prepolymer of aromatic diisocyanate and polyol. Part B may include an epoxy silane compound.

In certain embodiments, the amount of base component Part A and activator component Part B used is sufficient to provide a ratio of isocyanate equivalents to the sum of polyol and amine equivalents of about 1:1 to about 1.5:1. In other embodiments, the NCO/(OH+NH) ratio may be about 1.2:1 to about 1.4:1. The percent excess NCO in the Part B Activator component may be about 2% to 10%, optionally 5% to about 7%.

The following specific examples are provided to illustrate, but not limit, the preparation of the two component polyurethane formulations as discussed above.

Part A Base Samples according to these further embodiments were prepared according to the following examples.

The piperazine/DPHP premix for Base I contained the following components, and was prepared in a glass container by melting in an oven overnight:

| I  | Palatinol ® DPHP | 8.000 Wt % |
| II | Piperazine       | 1.170 Wt % |

| Preparation Of Base I | | |
|---|---|---|
| | Base I Components | Wt % |
| 1  | Pluracol ® 220            | 31.000 |
| 2  | Resimene ® 747            | 1.610  |
| 3  | Dynasylan ® GLYMO silane  | 0.241  |
| 4  | Irganox ® 1135            | 0.500  |
| 5  | Tinuvin ® 328             | 0.250  |
| 6  | Tinuvin ® 765             | 0.250  |
| 7  | Expancel ® 461 DET 40 d25 | 0.478  |
| 8  | Quicklime                 | 1.610  |
| 9  | Supercoat ®, wet          | 54.869 |
| 10 | Piperazine/DPHP premix    | 9.170  |
| 11 | T-12 Catalyst             | 0.023  |
|    | Total Weight              | 100.000 |

Synthesis Procedure for Base 1:

Items 1-6 were added, mixed to wet out, and Item 7 was added and mixed. Items 8-9 were added and mixed, were heated to 71° C. and mixed. Item 10 was added, mixed, and cooled to 43° C. Item 11 was added, mixed well, and packaged.

The piperazine/DPHP premix for Base II contained the following components, and was prepared in a glass container by melting in an oven overnight:

| I  | Palatinol ® DPHP | 8.241 Wt % |
| II | Piperazine       | 1.170 Wt % |

| Preparation Of Base II | | |
|---|---|---|
| | Base II Components | Wt % |
| 1  | Pluracol ® 220            | 31.000 |
| 2  | Resimene ® 747            | 1.610  |
| 3  | Irganox ® 1135            | 0.500  |
| 4  | Tinuvin ® 328             | 0.250  |
| 5  | Tinuvin ® 765             | 0.250  |
| 6  | Expancel ® 461 DET 40 d25 | 0.478  |
| 7  | Quicklime                 | 1.610  |
| 8  | Supercoat ®, wet          | 54.869 |
| 9  | Piperazine/DPHP premix    | 9.411  |
| 10 | T-12 Catalyst             | 0.023  |
|    | Total Weight              | 100.000 |

Synthesis Procedure for Base II:

Items 1-5 were added, and mixed to wet out. Item 6 was added and mixed. Items 7-8 were added and mixed, and were heated to 71° C., and mixed. Item 9 was added, mixed, and cooled to 43° C. Item 10 was added, mixed well, and packaged.

Preparation Of Base III:

| | Base III Components | Wt % |
|---|---|---|
| 1 | Pluracol ® 220 | 25.122 |
| 2 | Pluracol ® 726 | 11.550 |
| 3 | Multranol ® 9168 | 3.400 |
| 4 | Palatinol ® DPHP | 10.200 |
| 5 | Irganox ® 1135 | 0.340 |
| 6 | Tinuvin ® 571 | 0.276 |
| 7 | Tinuvin ® 765 | 0.276 |
| 8 | Resimene ® 747 | 1.592 |
| 9 | Dynasylan ® GLYMO silane | 0.205 |
| 10 | Quicklime | 1.220 |
| 11 | Ultra-Pflex ®, dried | 5.334 |
| 12 | Drikalite ®, dried | 39.154 |
| 13 | Expancel ® 551 DE 40 d42 | 0.680 |
| 14 | Expancel ® 551 DE 40 d42 | 0.680 |
| 15 | T-12 Catalyst | 0.011 |
| 16 | 2-Ethylhexanoic acid | 0.043 |
| | Total Weight | 100.000 |

Synthesis Procedure for Base III:
Items 1-9 were added and mixed to wet out. Items 10-12 were added, heated to 71° C. (160° F.), mixed, and cooled to 49° C. (120° F.). Items 13-14 were added and mixed. Items 15-16 were added, mixed well, and packaged.

The use of dried fillers in the base component of the polyurethane sealant or adhesive may assist in overcoming sticky cure characteristics, poor sag resistance, and loss of primerless adhesion sometimes associated with the use of wet fillers. However, these problems may also be overcome when using wet fillers by at least one of utilizing piperazine or a diamine such as ethylenediamine, naphthalenediamine or mixtures thereof in the base component which may increase thixotropy, adding a melamine compound to the base component, and/or moving at least a portion of silane-containing compounds to the activator component to avoid silane hydrolysis.

The preparation of intermediate prepolymers may require high temperatures and long reaction times when using amine catalysts. High temperatures also may induce crystallization of the xylenol component in the intermediate prepolymer reaction mixture. The use of metal or organo-metallic catalysts, such as tin- and/or bismuth-containing based catalysts, may increase reaction speed while lowering reaction temperature, substantially eliminating xylenol crystallization, reducing production time and providing good shelf stability.

Intermediate prepolymers were prepared according to the following examples.

Preparation of Intermediate Prepolymer Sample IV:

| | Intermediate Sample IV Components | Wt % |
|---|---|---|
| 1 | 2,5-Xylenol | 17.243 |
| 2 | Palatinol ® DPHP | 62.773 |
| 3 | Lupranate ® M10 | 19.795 |
| 4 | Dabco ® T-12 | 0.03 |
| 5 | K-Kat ® 348 | 0.03 |
| 6 | PTSI | 0.128 |
| | Total Weight | 99.974 |
| | Prepolymer NCO %, Final | 0.466 |

Xylenol and DPHP were added, mixed, and nitrogen purged. Lupranate® M10, Dabco® T-12, and K-Kat® 348 were added, mixed, heated to 60° C. to react for 1 hour, and cooled down. PTSI was added, mixed, and the mixture packaged.

Preparation of Intermediate Prepolymer Sample V:

| | Intermediate Sample V Components | Wt % |
|---|---|---|
| 1 | 2,5-Xylenol | 17.243 |
| 2 | Palatinol ® DPHP | 62.773 |
| 3 | Lupranate ® M10 | 19.816 |
| 4 | Dabco ® T-12 | 0.02 |
| 5 | K-Kat ® 348 | 0.02 |
| 6 | PTSI | 0.128 |
| | Total Weight | 100.000 |
| | Prepolymer NCO %, Final | 0.472 |

Xylenol and DPHP were added, mixed, and nitrogen purged. Lupranate® M10, Dabco® T-12, and K-Kat® 348, were added, mixed, heated to 60° C. to react for 1 hour, and cooled down. PTSI was added, mixed, and the mixture packaged.

Part B samples of NCO terminated prepolymer activator were prepared according to the following examples.

Preparation Of Activator VI

| | Activator VI Components | Wt % |
|---|---|---|
| 1 | Pluracol ® 726 | 17.266 |
| 2 | Pluracol ® P1010 | 32.776 |
| 3 | BzCl, 2% in Pluracol ® 726 | 0.075 |
| 4 | Lupranate ® T80 | 14.036 |
| 5 | K-Kat ® 348 | 0.016 |
| 6 | Lupranate ® MI | 7.221 |
| 7 | PTSI | 0.159 |
| 8 | Dynasylan ® GLYMO silane | 0.611 |
| 9 | Intermediate IV | 27.738 |
| | Total Weight | 99.898 |
| | Prepolymer NCO %, Final | 5.837 |

Synthesis Procedure for Activator VI:
Pluracol® 726, Pluracol® P1010, and BzCl were added, mixed, and heated. Lupranate® T80 and K-Kat® 348 were added, reacted at 60° C. for 1 hour, and cooled down. Lupranate® MI, PTSI, GLYMO silane, and Intermediate IV were added, mixed, and packaged.

Preparation Of Activator VII

| | Activator VII Components | Wt % |
|---|---|---|
| 1 | Pluracol ® 726 | 17.266 |
| 2 | Pluracol ® P1010 | 32.776 |
| 3 | BzCl, 2% in Pluracol ® 726 | 0.119 |
| 4 | Lupranate ® T80 | 14.036 |
| 5 | Dabco ® 33LV, 50% in Pluracol ® 726 | 0.074 |
| 6 | Lupranate ® MI | 7.221 |
| 7 | PTSI | 0.159 |
| 8 | Dynasylan ® GLYMO silane | 0.611 |
| 9 | Intermediate IV | 27.738 |
| | Total Weight | 100.000 |
| | Prepolymer NCO %, Final | 5.837 |

Synthesis Procedure for Activator VII:
Pluracol® 726, Pluracol® P1010, and BzCl were added, mixed, and heated. Lupranate® T80 and Dabco® 33LV were added, reacted at 60° C. for 1-1.5 hour, and cooled down. Lupranate® MI, PTSI, GLYMO silane, and Intermediate IV were added, mixed, and packaged.

| Preparation Of Activator VIII | | |
|---|---|---|
| | Activator VIII Components | Wt % |
| 1 | Pluracol ® 726 | 17.266 |
| 2 | Pluracol ® P1010 | 32.776 |
| 3 | BzCl, 2% in Pluracol ® 726 | 0.119 |
| 4 | Lupranate ® T80 | 14.036 |
| 5 | Dabco ® 33LV, 50% in Pluracol ® 726 | 0.091 |
| 6 | Lupranate ® MI | 7.221 |
| 7 | PTSI | 0.159 |
| 8 | Dynasylan ® GLYMO silane | 0.611 |
| 9 | Intermediate IV | 27.738 |
| | Total Weight | 100.017 |
| | Prepolymer NCO %, Final | 5.837 |

Synthesis Procedure for Activator VIII:
Pluracol® 726, Pluracol® P1010, and BzCl were added, mixed, and heated. Lupranate® T80 and Dabco® 33LV were added, reacted at 60° C. for 1-1.5 hour, and cooled down. Lupranate® MI, PTSI, GLYMO silane, and Intermediate IV were added, mixed, and packaged.

While the use of metal catalysts in the activator component can achieve short production times at low reaction temperature, their presence can result in short pot life for reaction mixtures of base and activator. Amine catalysts may also provide short activator production times at low temperatures. Pot life may be extended when amine catalysts have been used in the activator, by addition of small amounts of acid to the base-activator reaction mixture, as demonstrated below. Suitable acids, which may be added to the base component and/or the base/activator reaction mixture, include organic acids, such as for example 2-ethylhexanoic acid, in amounts from about 0.02 to about 0.1 weight %, in certain embodiments about 0.08 weight %, based on the total weight of Part A and Part B.

Part A Base samples were combined with Part B Activator samples according to the following examples, and evaluated with respect non-sag and viscosity properties, tensile and elongation properties, and adhesion in peel properties as a demonstration of primerless adhesion on concrete.

Tensile and elongation properties were evaluated using ASTM D412 Standard Test Methods for Vulcanized Rubber and Thermoplastic Elastomers—Tension, with the polyurethane sealants demonstrating high elongations of at least 300% or greater, and low 100% moduli of about 482-758 kPa (70-110 psi). Non-sag properties were demonstrated by testing according to ASTM Method D2202 Standard Test Method For Slump Of Sealants, with the polyurethane sealants demonstrating non-sag properties of 0.0-0.03 B/S. Viscosity properties were evaluated using Brookfield DV-II+ viscometer, spindle #96, waiting for 7 seconds before taking reading, resulting in about 1100-4800 Pa·s (about 11,000-48,000 poise). Primerless adhesion on concrete was demonstrated by testing according to ASTM C794 Standard Test Method for Adhesion-in-Peel of Elastomeric Joint Sealants, with cohesive failure at a load range of a peel strength of about 88.8-120 N or 20-27 lbf.

The Examples of non-sag sealants in Table 6 were prepared by mixing the following components:

Example 17 was prepared by mixing 137.63 g of Base I with 62.37 g of Activator VI at a maximum reaction temperature of 80.6° F. (27° C.). Testing could not be conducted.

Example 18 was prepared by mixing 146.39 g of Base II with 63.61 g of Activator VII at a maximum reaction temperature of 80.6° F. (27° C.). Testing was conducted at 18 days.

Example 19 was prepared by mixing 147.91 g of Base II with 62.09 g of Activator VIII at a maximum reaction temperature of 80.6° F. (27° C.). Testing was conducted at 12 days.

Example 20 was prepared by mixing 209.13 g of Base II with 90.83 g of Activator VIII at a maximum reaction temperature of 80.6° F. (27° C.). Testing was conducted at 13 days.

As indicated by the results reported in Table 6, mixed sealants comprising Activator VI displayed poorer non-sag properties, and were unable to reach a full cure stage. Activators VII and VIII improved non-sag properties, and approach full curing for mixed sealants. Activator VI comprised a metal catalyst but not an amine catalyst, while Activators VII and VIII, comprised an amine catalyst. Equilibrium in reactivity between activator and base was realized with use of the latter activators. Activators VII and VIII, as shown above, also exhibited a fast production cycle, and low reaction temperature.

TABLE 6

| Non-Sag Sealant | | | | |
|---|---|---|---|---|
| Example # | 17 | 18 | 19 | 20 |
| Base | I | II | II | II |
| Activator | VI | VII | VIII | VIII |
| NCO/(OH + NH) equivalent ratio | 1.26 | 1.24 | 1.2 | 1.24 |
| Non-Sag, B/S | 0.06 | 0.03 | 0.00 | 0.02 |
| Mixed viscosity, poise | 10,400 | 11,400 | 15,400 | 11,500 |
| Mixed viscosity, Pa · s | | | | |
| Tensile strength, psi | Film did not cure, gummy | 183 | 180 | 187 |
| Tensile strength, kPa | Not cured | 1,261 | 1,241 | 1,289 |
| 100% Modulus, psi | — | 72 | 73 | 80 |
| 100% Modulus, kPa | | 496 | 503 | 551 |
| Elongation, % | — | 454 | 464 | 427 |
| Hardness, Shore A | — | 31 | 29.3 | 34.2 |

The Examples of self-leveling sealants in Table 7 were prepared by mixing the following components:

Example 21 was prepared by mixing 121.73 g of Base III with 43.27 g of Activator VI at a maximum reaction temperature of 80.6° F. (27° C.). Testing could not be conducted.

Example 22 was prepared by mixing 122.55 g of Base III with 42.45 g of Activator VI at a maximum reaction temperature of 80.6° F. (27° C.). Testing was conducted at 14 days.

Example 23 was prepared by mixing 122.55 g of Base III with 42.45 g of Activator VII at a maximum reaction temperature of 80.6° F. (27° C.). Four drops of 2-Ethylhexanoic acid was added during mixing to extend pot life. Testing was conducted at 12 days.

Example 24 was prepared by mixing 122.27 g of Base III with 37.73 g of Activator VIII at a maximum reaction temperature of 80.6° F. (27° C.). Testing was conducted at 12 days.

Example 25 was prepared by mixing 122.55 g of Base III with 42.45 g of Activator VIII at a maximum reaction temperature of 80.6° F. (27° C.). Testing was conducted at 12 days.

Example 26 was prepared by mixing 122.55 g of Base III with 42.45 g of Activator VIII at a maximum reaction temperature of 80.6° F. (27° C.). Four drops of 2-Ethylhexanoic acid was added during mixing to extend pot life. Testing was conducted at 12 days.

For self-leveling sealants, Activator VI, which comprised a metal-containing catalyst but not an amine catalyst, provided too short a pot life. Activators VII and VIII, which comprised an amine catalyst, provided a longer pot life than did Activator VI. A small addition of acid, for example an organic acid such as 2-Ethylhexanoic acid (available from BASF Corporation, Freeport, Tex.), in an amount of from about 0.02 to about 0.1% by weight of Part A and Part B components can increase pot life, in some embodiments from 2 hours to 5 or 6 hours. Test results are shown in Table 7.

TABLE 7

Self-Leveling Sealant

| Example # | 21 | 22 | 23 |
|---|---|---|---|
| Base | III | III | III |
| Activator | VI | VII | VII |
| Extra acid, % | None | None | 0.048 |
| NCO/OH equivalent ratio | 1.4 | 1.4 | 1.4 |
| Pot life, hour | <0.5 | 2 | 5 |
| Tensile strength, psi | Reacted too fast | 170 | 159 |
| Tensile strength, kPa |  | 1,172 | 1,096 |
| 100% Modulus, psi | — | 110 | 87 |
| 100% Modulus, kPa |  | 758 | 600 |
| Elongation, % | — | 318 | 471 |
| Hardness, Shore A | — | 34.8 | 30.3 |
| NCO/OH equivalent ratio | 1.25 | 1.4 | 1.4 |
| Pot life, hour | 2 | 2 | 6 |
| Tensile strength, psi | 141 | 163 | 158 |
| Tensile strength, kPa | 972 | 1,123 | 1,089 |
| 100% Modulus, psi | 82 | 107 | 86 |
| 100% Modulus, kPa | 565 | 737 | 593 |
| Elongation, % | 434 | 315 | 469 |
| Hardness, Shore A | 32.1 | 32.2 | 28.8 |

It will be understood that the embodiments described herein are merely exemplary. Further, all embodiments disclosed are not necessarily in the alternative, as various embodiments may be combined to provide the desired result.

We claim:

1. A two part construction sealant or adhesive comprising a base component Part A and an activator component Part B, wherein at least one of Part A or Part B contains an epoxy silane, and at least one of Part A or Part B contains a melamine compound:
   Part A comprising:
      a polyol; and
      optionally the epoxy silane and/or the melamine compound; and
   Part B comprising:
      a prepolymer reaction product comprising the residues of
         xylenol, or xylenol and an additional polyol, and
         a polymeric isocyanate or an aromatic diisocyanate, or a polymeric isocyanate and an aromatic diisocyanate;
      optionally the epoxy silane and/or the melamine compound; and
   optionally, wherein Part A additionally comprises a plasticizer; further optionally wherein Part B additionally comprises at least one epoxy silane, or a mixture of at least one epoxy silane and at least one melamine compound.

2. The sealant or adhesive according to claim 1, wherein the sealant or adhesive exhibits at least one of a paint adhesion of at least about 3B when tested according to ASTM D3359, a non-sag value of about 0.0-0.1 B/S when tested according to ASTM D-2202, a primerless adhesion to concrete of at least about 22.2 N (5 lbf) when tested according to ASTM C794, a 100% modulus of less than about 970 kPa (140 psi) when tested according to ASTM D412, and an elongation to break of about 200% or greater when tested according to ASTM D412.

3. The sealant or adhesive according to claim 1, wherein the epoxy silane comprises at least one of 3-glycidoxypropyltrimethoxysilane, 3-glycidoxypropyltriethoxysilane, 3-glycidoxypropylmethyldimethoxysilane, 3-glycidoxypropylmethyldiethoxysilane, beta-(3,4-epoxycyclohexyl)ethyltrimethoxysilane, beta-(3,4-epoxycyclohexyl)ethyl triethoxysilane, or mixtures thereof.

4. The sealant or adhesive according to claim 1, wherein the melamine compound comprises at least one of hexamethoxymethyl melamine formaldehyde resin; pentamethoxymethyl melamine formaldehyde resin; hexamethoxy n-butyl/methyl melamine formaldehyde resin; pentamethoxymethyl/n-butyl melamine formaldehyde resin; imino based, methylated melamine formaldehyde resin; methylol based, n-butylated melamine formaldehyde resin; or mixtures thereof.

5. The sealant or adhesive according to claim 1, wherein the xylenol comprises at least one of 2,5-xylenol, 2,4-xylenol, 2,6-xylenol, 2,3-xylenol, 3,4-xylenol, 3,5-xylenol, or mixtures thereof.

6. The sealant or adhesive according to claim 1, wherein the polyol comprises at least one of a diol, triol or tetrol with a nominal weight average molecular weight of between 1,000 and 6,000, or mixtures thereof, optionally wherein the polyol comprises at least one of polyether triol, polyester triol, polyether polyol, propoxylated ethylenediamine polyol, polypropylene glycol, propylene oxide adduct of glycerine, amine-based polyether polyol, or mixtures thereof, further optionally wherein the diol, triol or tetrol having a nominal weight average molecular weight of between 1,000 and 6,000 comprises at least one primary hydroxyl terminated polyol.

7. The sealant or adhesive according to claim 1, wherein the polyol comprises at least one of ethylene glycol, diethylene glycol, propylene glycol, dipropylene glycol, butanediol, glycerol, trimethylolpropane, triethanolamine, pentaerythritol, sorbitol, or mixtures thereof.

8. The sealant or adhesive according to claim 1, wherein Part A additionally comprises at least one of piperazine, ethylenediamine, naphthalenediamine or mixtures thereof.

9. The sealant or adhesive according to claim 1, wherein the theoretical excess mol % NCO of Part B is in the range of about 2% to about 10% with respect to the NCO equivalent in Part B and the sum of HO and NH equivalents in Part A.

10. The sealant or adhesive according to claim 1, wherein the Part B aromatic diisocyanate and/or polymeric isocyanate comprises at least one of toluene diisocyanate (TDI), methylene diphenyl diisocyanate (MDI), phenylene diisocyanate, diphenylmethane diisocyanate, polyphenylmethane polyisocyanate (polymeric MDI), naphthalene diisocyanate, triphenylmethane triisocyanate, diphenyl sulfone diisocyanate, ethylene diisocyanate, propylene diisocyanate, toluene 2,4-diisocyanate, toluene 2,6-diisocyanate, naphthylene 1,5-diisocyanate, 4,4'-methylene diphenyl diisocyanate, 2,4'-methylene diphenyl diisocyanate, urethodione diisocyanate, hexahydrotolylene diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate; and 3,3'-dimethyldiphenylmethane-4,4'-diisocyanate, isomers, dimers and/or trimers of these diisocyanates, or mixtures thereof.

11. The sealant or adhesive according to claim 1, wherein the Part B comprises an isocyanate terminated prepolymer reaction product, which comprises at least one of:
   i) the reaction product of xylenol and a polymeric isocyanate;

ii) the reaction product of a polyol and an aromatic diisocyanate with an intermediate reaction product of xylenol and a polymeric isocyanate;

iii) the reaction product of xylenol and a polymeric isocyanate with an intermediate reaction product of a polyol and an aromatic diisocyanate; or iv) the reaction product of xylenol, a polyol, a polymeric isocyanate and an aromatic diisocyanate; or v) the reaction product of xylenol with an intermediate reaction product of polyol and aromatic diisocyanate.

12. The sealant or adhesive according to claim 1, wherein Part A additionally comprises at least one of catalyst, inorganic filler, colorant, antioxidant, UV light absorber, adhesion promoter, calcium oxide, expandable microspheres, drying agent, organic filler, chain extender, UV stabilizer, light stabilizer, fungicide, mildewcide, biocide, fire retardant, surface additive, mineral oil, dispersing agent, defoaming agent, storage stabilizer, latent hardener, cure retardant, antifoaming agent, solvent, or mixtures thereof.

13. A two part construction sealant or adhesive comprising a base component Part A and an activator component Part B;
Part A comprising:
  a polyol; and
  an epoxy silane and/or a melamine compound; and
Part B comprising:
  a prepolymer reaction product comprising the residues of
    xylenol, or xylenol and an additional polyol, and
    a polymeric isocyanate or an aromatic diisocyanate, or a polymeric isocyanate and an aromatic diisocyanate; and
  an epoxy silane compound;
optionally, wherein Part A additionally comprises a plasticizer.

14. The sealant or adhesive according to claim 3, wherein the sealant or adhesive exhibits at least one of a non-sag value of about 0.0-0.3 B/S when tested according to ASTM D-2202, a 100% modulus of less than about 970 kPa (140 psi) when tested according to ASTM D412, and an elongation to break of about 300% or greater when tested according to ASTM D412.

15. A method of making a two part construction sealant or adhesive of claim 1, the method comprising:
  a) providing the base component Part A and the activator component Part B; and
  b) mixing the activator component Part B with base component Part A, and optionally a Part C component comprising pigment or a mixture of pigment and polyol, to form a sealant or adhesive reaction product.

16. The method of claim 15, wherein the activator component Part B is made by a) providing the xylenol and the polymeric isocyanate, and b) mixing the xylenol with the polymeric isocyanate to form an isocyanate-terminated prepolymer reaction product.

17. The method of claim 15, wherein the activator component Part B is made by a) providing the xylenol, the polymeric isocyanate, at least one polyol, and at least one aromatic diisocyanate, b) mixing the xylenol with the polymeric isocyanate to form an intermediate reaction product, and c) mixing the polyol and the aromatic diisocyanate with the intermediate reaction product to form an isocyanate-terminated prepolymer reaction product.

18. The method of claim 15, wherein the activator component Part B is made by a) providing the xylenol, the polymeric isocyanate, at least one polyol, and at least one aromatic diisocyanate, b) mixing the polyol and the aromatic diisocyanate to form an intermediate reaction product, and c) mixing the xylenol and the polymeric isocyanate with the intermediate reaction product to form an isocyanate-terminated prepolymer reaction product.

19. The method of claim 15, wherein the activator component Part B is made by a) providing the xylenol, the polymeric isocyanate, at least one polyol, and at least one aromatic diisocyanate, and b) mixing the xylenol, the polymeric isocyanate, the polyol, and the aromatic diisocyanate to form an isocyanate-terminated prepolymer reaction product.

20. The method of claim 15, wherein the activator component Part B is made by a) providing the xylenol, at least one polyol, and at least one aromatic diisocyanate, b) mixing the polyol and the aromatic diisocyanate to form an intermediate reaction product, and c) mixing the xylenol with the intermediate reaction product to form an isocyanate-terminated prepolymer reaction product.

21. The method of claim 15, further comprising applying the adhesive or sealant reaction product to a substrate, optionally wherein the substrate at least one of concrete, stone, metal, ceramic, glass, plastic, wood, asphalt, thermoplastic materials, thermoset materials, rubber, or composite materials, further optionally wherein said applying is at least one of spraying, brushing, rolling, squeegeeing, scraping, troweling, or combinations thereof.

22. The method of claim 21, further comprising applying paint to the sealant or adhesive, wherein the paint adheres to the surface of the sealant or adhesive with a rating of at least 3B when tested according to paint adhesion test ASTM D3359, optionally wherein the paint is at least one of latex paint, solvent-borne paint, or solvent-free paint.

23. A method of making a two part construction sealant or adhesive of claim 13, the method comprising:
  a) providing the base component Part A and the activator component Part B; and
  b) mixing the activator component Part B with base component Part A, and optionally a Part C component comprising pigment or a mixture of pigment and polyol, to form a sealant or adhesive reaction product.

24. The method of claim 23, further comprising providing an acid to a mixture of the activator component Part B and base component Part A.

25. The method of claim 23, wherein the activator component Part B prepolymer reaction product comprises an intermediate prepolymer catalyzed by a metal or organo-metallic catalyst, optionally a tin-containing or bismuth-containing catalyst or mixtures thereof.

26. The method of claim 23, wherein the activator component Part B reaction product is catalyzed by an amine-containing catalyst.

* * * * *